W. A. TURBAYNE.
CHARGING APPARATUS.
APPLICATION FILED AUG. 25, 1909.
991,113.
Patented May 2, 1911.
2 SHEETS—SHEET 1.
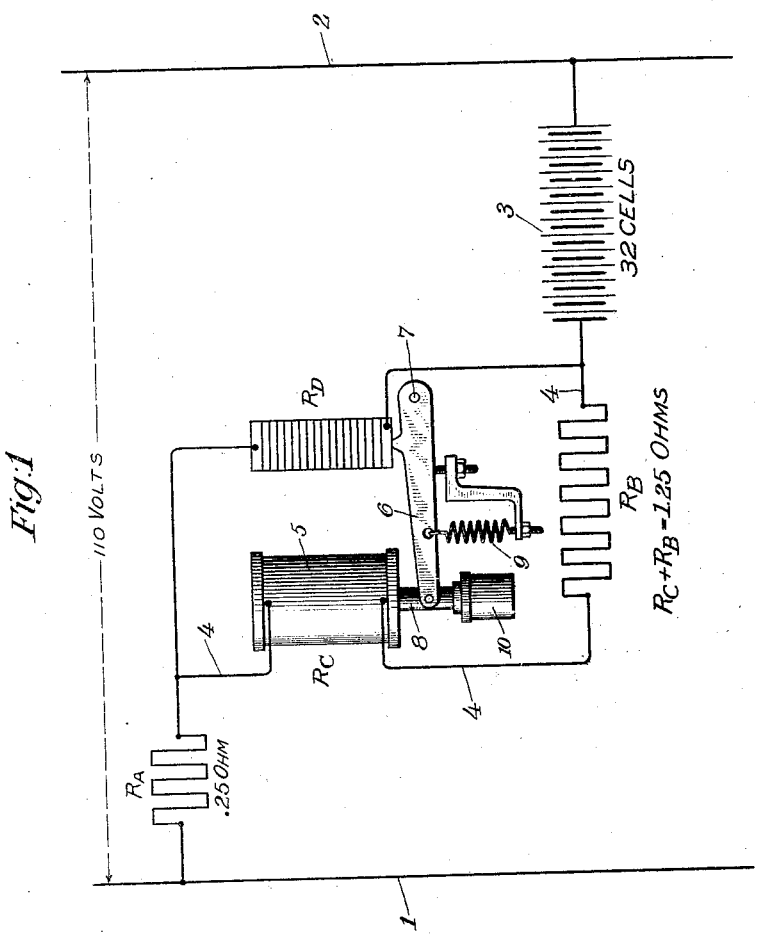

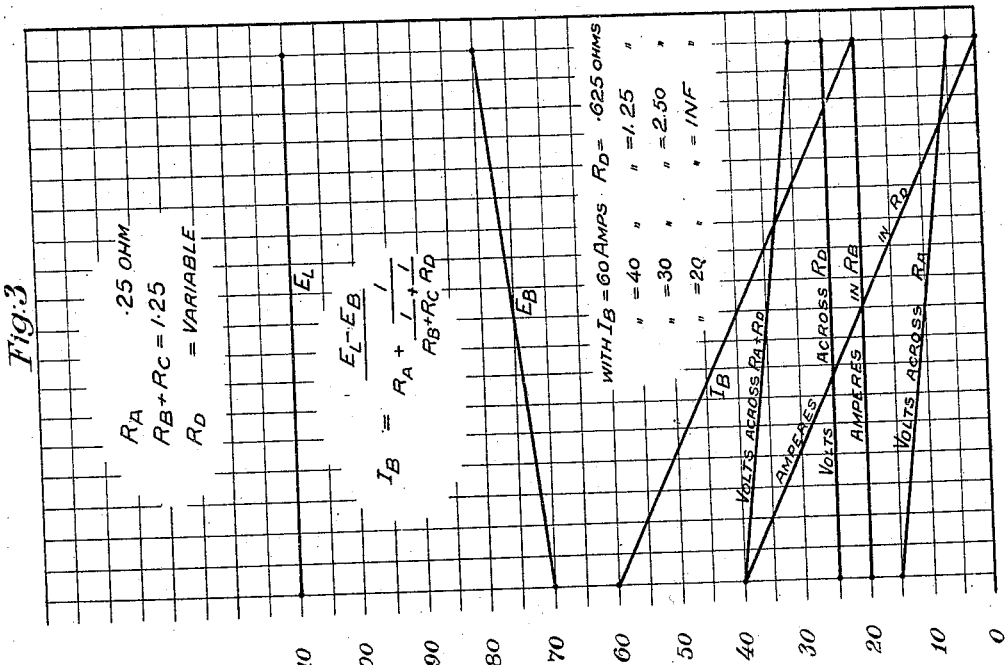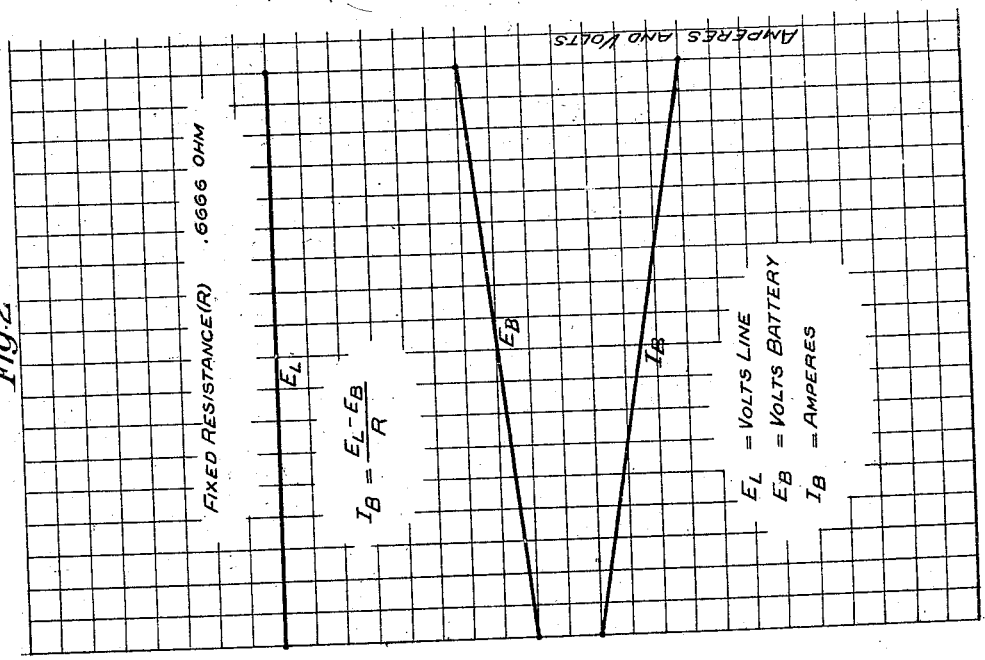

UNITED STATES PATENT OFFICE.

WILLIAM A. TURBAYNE, OF LANCASTER, NEW YORK, ASSIGNOR TO GOULD COUPLER COMPANY, A CORPORATION OF NEW YORK.

CHARGING APPARATUS.

991,113.   Specification of Letters Patent.   Patented May 2, 1911.

Application filed August 25, 1909. Serial No. 514,500.

*To all whom it may concern:*

Be it known that I, WILLIAM A. TURBAYNE, a citizen of the United States, and a resident of Lancaster, in the county of Erie, State of New York, have invented certain new and useful Improvements in Charging Apparatus, of which the following is a specification.

My invention relates to improvements in charging apparatus and is more especially directed to improvements in apparatus for charging storage batteries from a circuit supplying current at a substantially constant potential.

One object of my invention is to provide an arrangement by which the battery may be given a tapering charge of sufficient taper so that a thirty-two cell battery in a discharged condition will receive approximately sixty amperes while on becoming fully charged it will only receive approximately twenty amperes.

A further object of my invention is to provide an arrangement which will do this with the inclusion of a very small amount of apparatus of the simplest kind so that it is not liable to get out of order and it is much more reliable.

A further object is to provide an arrangement in which the energy consumed in the battery circuit external to the battery may be readily and sufficiently dissipated in the form of heat without unduly heating the parts or without the use of apparatus of abnormal size.

Further objects, features and advantages will more clearly appear from the detail description given below taken in connection with the accompanying drawings which form a part of this specification.

Referring to the drawings, Figure 1 represents diagrammatically an arrangement embodying one form of my invention. Fig. 2 is a diagram of curves illustrating the charging operation when only a fixed resistance is used in series with the battery. Fig. 3 is a diagram of curves illustrating the charging operation with my improved arrangement in circuit.

Referring to Fig. 1, 1 and 2 represent the lines of a circuit supplying a substantially constant potential of 110 volts. 3 represents a storage battery of thirty-two cells arranged to be connected across the circuit 1—2 in order to be charged thereby. In series with the battery 3 is a variable resistance $R_D$ which is in the form of a carbon pile. Also in series with the battery 3 and the carbon pile $R_D$ is a fixed resistance $R_A$ which is in the form of an iron grid resistance so that it readily dissipates the heat energy consumed therein. Connected in a branch circuit 4 across the carbon pile $R_D$ and in parallel therewith is another resistance $R_B$ which is also in the form of an iron grid for the same reason. In series with the resistance $R_B$ and connected in the branch circuit is a solenoid 5, the resistance of which is indicated by $R_C$. The solenoid 5 is arranged to control and vary the carbon pile resistance $R_D$ by means of a lever 6 pivoted at 7 and operated by the core 8 of the solenoid 5. A spring 9 is opposed to the action of the solenoid 5 and a dashpot 10 is provided for the core 8 in order to insure smooth operation. The fixed resistance $R_A$ is substantially .25 ohm while the sum of the resistances $R_C$ and $R_B$ is substantially 1.25 ohms. The parts are so adjusted that with the battery in a discharged condition and with the maximum current flowing, the solenoid 5 will compress the carbon pile resistance $R_D$ so that its resistance is substantially .625 ohm.

In order to more clearly understand the operation of my arrangement a consideration of Fig. 2 will show that the desired taper of charge cannot be obtained by using a simple fixed resistance in series with the battery. With the conditions as specified it would require a two-third ohm resistance in order to give the initial rate of sixty amperes with the battery at seventy volts. Under these conditions when the voltage of the battery rises ten volts to eighty, the battery current will only drop to forty-five amperes. But it is desired that the battery current drop to twenty amperes with this ten volt rise in the battery potential. The curves shown in Fig. 2 are easily plotted from the equation also shown in Fig. 2.

With my improved arrangement the apparatus is so designed that with the battery initially at seventy volts a sixty ampere current will flow and the resistance of the branch circuit 4 is so designed that twenty of the sixty amperes will flow through this circuit while forty of the sixty amperes will flow through the carbon pile $R_D$. Now upon any increase in the voltage of the battery due to its becoming charged there will be a tendency for the current to decrease through $R_D$ and also through the branch circuit 4. Any decrease in the current through the branch circuit 4 weakens the solenoid 5 so that the resistance of the carbon pile $R_D$ is increased until the current through the branch circuit 4 is brought back substantially to its original value, twenty amperes. A further increase in the battery voltage produces similar results so that the current in the branch circuit 4 is maintained substantially constant and the voltage across the resistances $R_C$ and $R_B$ is maintained substantially constant except for the slight increments necessary to cause the operation of the core 8, which increments may be neglected. This action continues until the resistance of the carbon pile $R_D$ substantially reaches infinity so that the circuit through $R_D$ is substantially open, when the only current furnished the battery will be the twenty amperes through the branch circuit 4. The solenoid 5 is so adjusted and the resistance $R_B$ is given such a value that with the lever 6 at its lower extremity and the carbon resistance assumedly open circuited the minimum rate of twenty amperes will enter the battery when the battery attains the back electro-motive force of eighty volts.

The parallel relation of the solenoid 5 and the resistance $R_B$ with the variable resistance $R_D$ and series resistance $R_A$, forces the voltage variations to be developed across the series resistance $R_A$, since the solenoid 5 acts to maintain substantially constant the voltage drop across the parallel branch circuit 4.

Upon switching the arrangement shown, including the thirty-two cells of battery, across the 110 volts supply, a current more than twenty amperes will flow, solenoid 5 will raise its core, thereby compressing the carbon resistance $R_D$ and reducing the resistance in this branch. This compression and consequent reduction of resistance will continue until the current through the circuit develops such a voltage across the resistance $R_A$ as to establish a condition of equilibrium in which substantially twenty amperes flow through the branch circuit 4 when no further increase of compression will take place.

Rise of battery back pressure will be followed by current reduction and as the carbon pile $R_D$ with the solenoid 5 acts to maintain substantially constant the voltage drop across the fixed resistance $R_B$, $R_C$, it follows that the voltage drop at any period across the series resistance $R_A$ must be the difference between the battery electromotive force plus the fixed electromotive force across the branch circuit 4 and the voltage of the line. From this we get the values shown by the curves of Fig. 3.

Referring to Fig. 3 it will be seen that as the battery back pressure increases from seventy to eighty volts the voltage across the resistance $R_A$ drops from fifteen to five. The current in $R_B$ remains substantially constant as does also the voltage across $R_D$. The current in $R_D$ however drops from forty amperes to substantially nothing so that the battery charging current drops from sixty amperes to substantially twenty amperes.

It is obvious that widely varying values of charging rate may be obtained by merely varying the tension of spring 9 or the initial carbon compression of the resistance $R_D$ without modifying the values of the fixed grid resistances $R_A$ and $R_B$.

By providing the fixed resistances $R_A$ and $R_B$ of the iron grid form they readily dissipate the heat of the energy consumed therein so that much less heat energy need be consumed in the carbon pile $R_D$ which may therefore not be made unnecessarily bulky as would ordinarily be the case. Furthermore a large amount of the heat given off is dissipated from the grids $R_A$ and $R_B$ in which it can do no damage.

Although I have described my improvements in great detail, nevertheless it will be obvious to those skilled in the art that various modifications may be made to suit particular conditions without departing from the spirit and scope of my invention, and, therefore, I do not desire to be limited to the particular arrangement shown, but Having fully and clearly described my invention, what I claim as new and desire to secure by Letters Patent is:

1. The combination of a storage battery, a charging circuit therefor, a fixed resistance in series with the battery and means for maintaining the voltage across said resistance substantially constant.

2. The combination of a storage battery, a charging circuit therefor, a fixed resistance in series with the battery and means for controlling the voltage across said resistance, as the voltage of the battery rises, to decrease the battery current.

3. The combination of a storage battery, a charging circuit therefor, a variable resistance in series with the battery, a fixed resistance in parallel with said variable resistance and means for controlling the variable resistance responsive to changes of current through the fixed resistance.

4. In an arrangement of the class described, the combination of a storage battery, a charging circuit therefor, a variable resistance in series with the battery, a fixed iron grid resistance in parallel with said variable resistance and means for controlling the variable resistance responsive to changes of voltage in the arrangement.

5. The combination of a storage battery, a charging circuit therefor, a variable resistance connected to vary the battery current and means for varying said resistance to decrease the battery current to give a tapering charge responsive to variations in the battery current.

6. The combination of a storage battery, a charging circuit therefor, a variable resistance for varying the battery current, a fixed resistance in series with the battery and means for controlling the variable resistance responsive to variations of current through said fixed resistance.

7. The combination of a storage battery, a charging circuit therefor, a variable resistance and a fixed resistance for varying the battery current, a second fixed resistance in series with the battery and means for varying the variable resistance to decrease the battery current responsive to decreases in current in said second fixed resistance.

8. The combination of a storage battery, a charging circuit therefor, a variable resistance and a fixed resistance in series with each other and the battery and means for increasing said variable resistance as the battery voltage rises and responsive to decreases in the battery current.

9. The combination of a storage battery, a charging circuit therefor, a variable resistance and a fixed resistance in series with each other and the battery, a second fixed resistance in parallel with the variable resistance and means for controlling the variable resistance responsive to changes of current in said second fixed resistance.

10. The combination of a storage battery a charging circuit therefor, a variable resistance and a fixed resistance in series with one another and the battery, a second fixed resistance in series with the battery and said first mentioned fixed resistance but in a parallel circuit with the variable resistance and a coil in said parallel circuit controlling the operation of the variable resistance.

11. The combination of a storage battery a charging circuit therefor, a variable resistance in series with the battery for varying the battery current, a coil in parallel with said resistance for controlling the action thereof and an iron grid resistance in series with the battery for the dissipation of heat.

12. The combination of a storage battery a charging circuit therefor, a variable resistance and an iron grid resistance in series with the battery and means for varying the variable resistance to decrease the battery current responsive to decreases in the battery current as the battery voltage rises.

13. The combination of a storage battery a charging circuit therefor, a variable resistance and an iron grid resistance in series with the battery, a second iron grid resistance in series with the battery but in a parallel circuit to the variable resistance and means for controlling the variable resistance responsive to current variations in said second grid resistance.

14. The combination of a storage battery a charging circuit therefor, a variable resistance and an iron grid resistance in series with the battery, a second iron grid resistance in series with the battery but in a parallel circuit to the variable resistance and a coil in series with said second grid resistance in the parallel circuit acting to cause an increase of the resistance of the variable resistance upon a decrease of current in said second grid resistance.

15. The combination of a storage battery, a charging circuit therefor, a variable resistance in series with the battery, a fixed resistance in parallel with said variable resistance and means for controlling the variable resistance responsive to changes of current through the fixed resistance, said variable resistance being in the form of a carbon pile.

16. The combination of a storage battery, a charging circuit therefor, a variable resistance and a fixed resistance in series with each other and the battery, a second fixed resistance in parallel with the variable resistance and means for controlling the variable resistance responsive to changes of current in said second fixed resistance, said variable resistance being in the form of a carbon pile.

17. The combination of a storage battery, a charging circuit therefor, a variable resistance and an iron grid resistance in series with the battery, a second iron grid resistance in series with the battery but in a parallel circuit to the variable resistance and means for controlling the variable resistance responsive to current variations in said second grid resistance, said variable resistance being in the form of a carbon pile.

18. The combination of a storage battery, a charging circuit therefor, a variable resistance for varying the battery current, an iron grid resistance in series with the battery for the dissipation of heat and means for regulating the voltage across said iron grid resistance to give the battery a tapering charge.

19. The combination of a storage battery, a charging circuit therefor, a variable resistance connected to vary the battery current and means for varying said resistance to decrease the battery current responsive to decreases in the battery current.

In testimony whereof, I have signed my name to this specification, in the presence of two subscribing witnesses.

WILLIAM A. TURBAYNE.

Witnesses:
PIERCE W. ENGLISH,
W. H. PATTENDEN.

Copies of this patent may be obtained for five cents each, by addressing the "Commissioner of Patents, Washington, D. C."